(12) United States Patent
Wataru et al.

(10) Patent No.: US 12,483,782 B2
(45) Date of Patent: Nov. 25, 2025

(54) SYSTEM FOR WIRELESS SYNCHRONIZED CAPTURING, AND SMART DEVICE

(71) Applicant: HUAWEI TECHNOLOGIES CO., LTD., Guangdong (CN)

(72) Inventors: Kishimoto Wataru, Tokyo (JP); Bo Zheng, Tokyo (JP); Carlos Emanuel Morales Espinoza, Tokyo (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/228,257

(22) Filed: Jul. 31, 2023

(65) Prior Publication Data
US 2023/0412918 A1   Dec. 21, 2023

Related U.S. Application Data

(63) Continuation of application No. PCT/CN2021/074613, filed on Feb. 1, 2021.

(51) Int. Cl.
*H04N 23/661* (2023.01)
*H04N 17/00* (2006.01)
(Continued)

(52) U.S. Cl.
CPC ......... *H04N 23/661* (2023.01); *H04N 17/002* (2013.01); *H04N 23/62* (2023.01)

(58) Field of Classification Search
CPC .... H04N 23/661; H04N 17/002; H04N 23/62; H04N 23/665; H04N 23/73; H04N 23/90
See application file for complete search history.

(56) References Cited

U.S. PATENT DOCUMENTS

| 7,605,861 B2 | 10/2009 | Lasalle et al. |
| 8,890,938 B2 * | 11/2014 | Jin ............... H04N 13/239 348/47 |

(Continued)

FOREIGN PATENT DOCUMENTS

CN    108234898 A    6/2018

OTHER PUBLICATIONS

Ansari Samee et al:"Wireless Software Synchronization of Multiple Distributed Cameras",2019 IEEE International Conference on Computational Photography (ICCP), IEEE, May 15, 2019 (May 15, 2019), pp. 1-9, X 033569193.

(Continued)

*Primary Examiner* — Ahmed A Berhan
(74) *Attorney, Agent, or Firm* — WOMBLE BOND DICKINSON (US) LLP

(57) ABSTRACT

The present disclosure provides a smart device. The smart device includes: single or multiple image sensors, a communication device, a processor; and a memory storing a computer program that, when executed by the processor, causes the processor to: synchronize a time of single or multiple timers of the smart device or the image sensors among the multiple smart devices, based on a protocol for time synchronization on wireless communication by using the communication device; and directly or indirectly control shutter opening and closing timing of each image sensor, in order to keep constancy of shooting time interval and phase, wherein the phase is a remainder obtained by dividing shooting time by the shooting time interval. The present disclosure improves the accuracy of synchronized capturing.

20 Claims, 9 Drawing Sheets

(51) Int. Cl.
*H04N 23/60* (2023.01)
*H04N 23/62* (2023.01)

(56) References Cited

U.S. PATENT DOCUMENTS

| | | | |
|---|---|---|---|
| 9,167,171 | B2 | 10/2015 | Muraki et al. |
| 9,928,633 | B2 | 3/2018 | Cotter et al. |
| 2016/0088210 | A1* | 3/2016 | Tanaka ................ H04N 23/661 |
| | | | 348/207.11 |
| 2017/0289525 | A1 | 10/2017 | Wivell |

OTHER PUBLICATIONS

Yin Xu, et al, "An End-to-End Measurement Study of Modern Cellular Data Networks", Semantic Scholar, DOI: 10.1007/978-3-319-04918-2_4Corpus ID: 8873659, 2014, total 10 pages.
Configuring Synchronized Capture with Multiple Cameras, https://www.flir.in/support-center/iis/machine-vision/application-note/configuring-synchronized-capture-with-multiple-cameras/, Friday, Dec. 22, 2017, total 14 pages.
Here is Odyssey, Share, https://gopro.com/en/US/news/here-is-odyssey, May 12, 2016, total 4 pages.
IEEE Std 1588™-2008, IEEE Standard for a Precision Clock Synchronization Protocol for Networked Measurement and Control Systems, IEEE Instrumentation and Measurement Society, Sponsored by the Technical Committee on Sensor Technology (TC-9), Jul. 24, 2008, total 289 pages.
Imaging Edge Mobile, Multi Camera Control-Controlling multiple cameras from a smartphone via Wi-Fi, SONY, https://support.d-imaging.sony.co.jp/app/iemobile/en/instruction/4_1_multi_rx0_connection.php, total 7 pages.
Eric Pare, "Smartphones VS DSLRs for bullet-time photography", Smartphones VS DSLRs for bullet-time photography-Xangle Camera Server, May 12, total 8 pages.
Aamir Mahmood, et al, "Time Synchronization in 5G Wireless Edge: Requirements and Solutions for Critical-MTC, "arXiv:1906.06380v1 [cs.IT] Jun. 14, 2019, total 7 pages.
Chris Taylor (catid), et al, "TimeSync: Time Synchronization library in C++", https://github.com/catid/TimeSync, total 5 pages.
Sameer Ansari, et al, "Wireless Software Synchronization of Multiple Distributed Cameras", arXiv:1812.09366v2 [cs.CV] Jun. 11, 2019, total 12 pages.

* cited by examiner

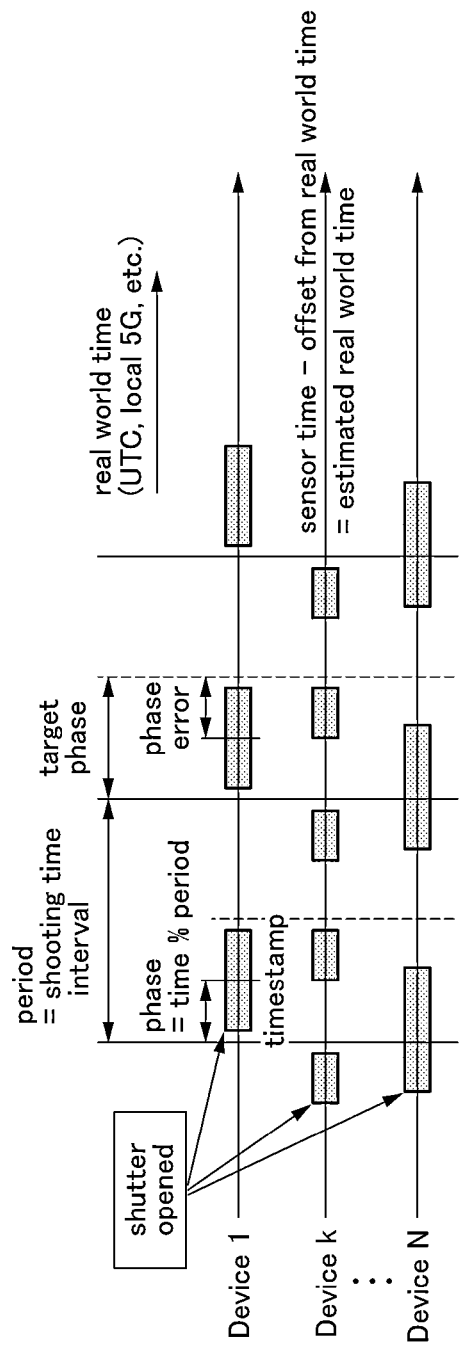

SYSTEM FOR WIRELESS SYNCHRONIZED CAPTURING, AND SMART DEVICE

CROSS-REFERENCE TO RELATED APPLICATIONS

This application is a continuation of International Application No. PCT/CN2021/074613, filed on Feb. 1, 2021, the disclosure of which is hereby incorporated by reference in its entirety.

TECHNICAL FIELD

The present disclosure relates to synchronized capturing of images by multiple devices.

BACKGROUND

Time-synchronized capturing (hereafter "sync-capture") means shooting time-synchronized images and videos, by single or multiple cameras on multiple devices at the same time. This technology is widely used for live video broadcasting and video content production, and in addition, it is the basis of many applications. For example, content production of multi-viewpoint image and video, 3D reconstruction of time sequences of depth images and 3D shapes of non-stationary subjects (objects to be captured), recording of light field sequences, etc.

A method of indirect shutter timing control on the order of microseconds for cameras of Android devices was proposed and disclosed in "Wireless Software Synchronization of Multiple Distributed Cameras. Sameer Ansari, Neal Wadhwa, Rahul Garg, Jiawen Chen, ICCP 2019" (hereinafter, referred to as "the prior art"). This paper mainly proposes two methods of shutter timing synchronization, and it focuses on the method of using "Frame Injection". By inserting a shooting named Frame Injection between the frames of the preview shootings at a certain shooting time interval, the shutter timing of the preview can be changed on the order of microseconds. By this method, the error of the shutter timing alone which does not include the synchronization error of the time can be suppressed to 20 microseconds. It describes that the system decreases the total error of sync-capture to 250 microseconds, using Simple Network Time Protocol (SNTP) on Wireless Fidelity (Wi-Fi) Hotspot as time synchronization among devices.

SUMMARY

A method of wireless synchronized capturing is provided to improve the accuracy of synchronized capturing.

According to a first aspect, a smart device is provided, where the smart device includes:
single or multiple image sensors, a communication device, a processor; and
a memory storing a computer program that, when executed by the processor, causes the processor to:
synchronize a time of single or multiple timers of the smart device or the image sensors among the multiple smart devices, based on a protocol for time synchronization on wireless communication by using the communication device; and
directly or indirectly control shutter opening and closing timing of each image sensor, in order to keep constancy of shooting time interval and phase, wherein the phase is a remainder obtained by dividing shooting time by the shooting time interval.

In an embodiment of the first aspect,
the shooting settings are adjusted by a user manually or adjusted by the user partially after auto adjustment shooting settings, including one or more of:
shooting time interval itself, target phase itself, image resolution, sensor type, exposure time, sensor sensitivity, focus distance, lens aperture, white balance, gamma correction, image un-distortion, image post-processing, and image recognition by additional machine learning system.

In an embodiment of the first aspect, the computer program causes the processor to:
attach a timestamp of the timer of the smart device or the image sensor to each image according to a consistent rule;
measure elapsed times between adjacent captured frame timestamps;
get an actual shooting time interval precisely by averaging of measured elapsed times; and
confirm stability of shooting time interval by checking if variance of measured elapsed times is smaller than a predetermined threshold or not.

In an embodiment of the first aspect, the computer program causes the processor to:
perform injection shooting with some exposure time lengths and then measure the actual phase shift length;
test multiple injection shots with different exposure time length, and clarify a model of the relationship between injection length and phase shift length in run-time under some shooting settings; and
if the model of the relationship is fixed for some types of smart devices and some shooting settings, calculate inversely the best exposure time length of an injection shot from the current phase error.

In an embodiment of the first aspect, when different elapsed time after the injection shot appears and the time lengths are A and B, A is smaller than constant shooting time interval, B is larger than the constant shooting time interval, both of A and B appear only once after the injection shot, $A+B$ is equal to $2T+\delta$, and T is a controllable injection shot time length and $\delta$ is device-specific constant time length, the computer program causing the processor to:
get the constant shooting time interval and check its stability by measuring the shooting time intervals multiple times;
measure $A+B$ after the injection shot in which length of shooting time is T;
get the average value of $\delta$ by multiple values calculated by $A+B-2T$, and check the stability of $\delta$;
get the current phase error $\varepsilon$ that is equal to phase minus target phase, wherein the target phase is half of the shooting time interval;
get T so that $\varepsilon+2T+\delta$ is equal to integral multiplication of shooting time interval; and
perform an injection shot in which length of shooting time is T, in order to make phase error zero.

In an embodiment of the first aspect, when the smart device is a smart device that is selected by one or more other smart devices, the computer program causes the processor to:
run automatic adjustment of shooting settings and wait for conversion of it;
measure the adjustment result;
broadcast the result to the one or more other devices, in order to capture with the same shooting settings by multiple devices;

periodically check the phase error at each smart device; and when a user starts still capturing or continuous capturing, capture images synchronously among all the smart devices, wherein shooting time intervals are the same and phase error is zero.

In an embodiment of the first aspect, when the smart device is a smart device that selects the other smart device, the computer program causes the processor to:

receive result of automatic adjustment of shooting settings from the other selected device, in order to capture with the same shooting settings by multiple devices;

periodically check the phase error at each smart device; and when a user starts still capturing or continuous capturing, capture images synchronously among all the smart devices, wherein shooting time intervals are the same and phase error is zero.

In an embodiment of the first aspect, the computer program causes the processor to:

show a user interface in order to let a user select "Auto", "Manual", "Follow", a following device, and related parameters, for each setting item and parameter of shooting settings; and when "Auto" is selected, update related settings automatically and independently;

when "Manual" is selected, use user's manual settings independently; or when "Follow" is selected, use following device's settings.

In an embodiment of the first aspect, when the system can control shutter open/close timing directly in real-time, in order to realize synchronized capturing, the computer program causes the processor to:

synchronize times between timers of devices or sensors based on a protocol for time synchronization on wireless communication by using the communication device;

if the image sensor does not have its own timer, use a smart device timer with time lag correction;

set the timer to trigger the image sensor to open its shutter at the time when (t % p) is equal to (φ−E/2) % p, and to close its shutter at the time when (t % p) is equal to (φ+E/2) % p, so that the image sensor sends captured image to memory with a timestamp of (t−t % p)*p+φ, wherein t is timer's time, p is shooting time interval, φ is target phase which is half of the shooting time interval, E is exposure time length, and % means MOD operation; and when users or the program changes the settings, set the changed settings to those of the timer again.

In an embodiment of the first aspect, the computer program causes the processor to:

show a user interface to start still shooting and continuous shooting on all the smart devices;

when a user operates the user interface to start shooting, broadcast the shooting start commands with a target timestamp to all the smart devices participating in sync-capture;

keep recent captured images by any of the smart devices on its memory for a while, in order to save the captured images on its memory to its storage when necessary;

when the smart device receives shooting a start command or a shooting stop command, save the target images to its storage; and send the saved images to the other devices or cloud for data sharing.

According to a second aspect, a wireless synchronized image capturing system is provided, where the wireless synchronized image capturing system includes multiple smart devices, and each smart device includes:

single or multiple image sensors, a communication device, a processor; and a memory storing a computer program that, when executed by the processor, causes the processor to:

synchronize a time of single or multiple timers of the smart device or the image sensors among the multiple smart devices, based on a protocol for time synchronization on wireless communication by using the communication device; and directly or indirectly control shutter opening and closing timing of each image sensor, in order to keep constancy of shooting time interval and phase, wherein the phase is a remainder obtained by dividing shooting time by the shooting time interval.

According to a third aspect, a method for operating a smart device is provided, where the method includes single or multiple image sensors, a communication device, and a processor, wherein the method includes:

synchronizing, by a processor, a time of single or multiple timers of the smart device or the image sensors among the multiple smart devices, based on a protocol for time synchronization on wireless communication by using the communication device; and directly or indirectly controlling, by the processor, shutter opening and closing timing of each image sensor, in order to keep constancy of shooting time interval and phase, wherein the phase is a remainder obtained by dividing shooting time by the shooting time interval.

According to a fourth aspect, a computer-readable storage medium is provided, where the computer-readable storage medium stores a computer program that, when executed by a processor, causes the processor to:

synchronize a time of single or multiple timers of a smart device or image sensors among multiple smart devices, based on a protocol for time synchronization on wireless communication by using a communication device; and directly or indirectly control shutter opening and closing timing of each image sensor, in order to keep constancy of shooting time interval and phase, wherein the phase is a remainder obtained by dividing shooting time by the shooting time interval.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description merely show some embodiments of the present disclosure, and one of ordinary skilled in the art may still derive other drawings from these accompanying drawings without creative effort.

FIG. 7A shows the state in which the multiple devices participating in the sync-capture have completed time synchronization;

DESCRIPTION OF EMBODIMENTS

The following clearly and completely describes the technical solutions in the embodiments of the present disclosure with reference to the accompanying drawings in the embodiments of the present disclosure. The described embodiments are only some but not all of the embodiments of the present disclosure. All other embodiments obtained by one of ordinary skilled in the art based on the embodiments of the present disclosure without creative efforts shall fall within the protected scope of the present disclosure.

Figure 1:
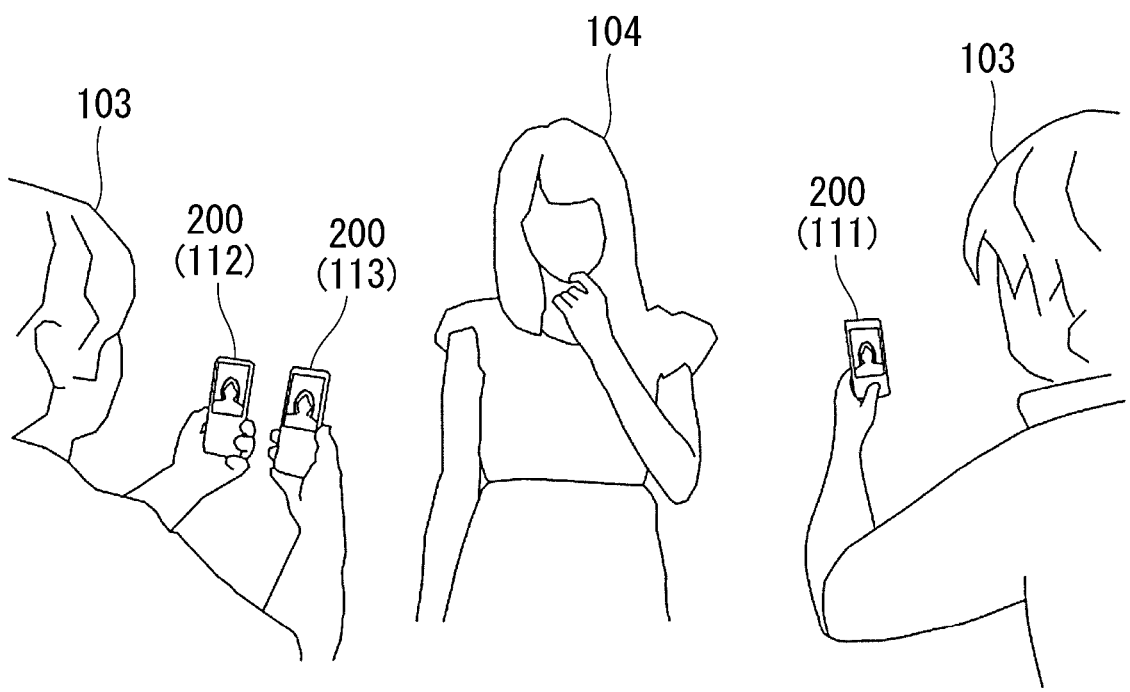
FIG. 1 shows an exemplary usage scenario of a sync-capture system 100.

FIG. 1 illustrates an exemplary usage scenario of a sync-capture system 100 for Embodiment 1 and Embodiment 2 described later. The system 100 is implemented by multiple smart devices 200 and a sync-capture application 300 running on each device. One or more users 103 use this system to shoot a subject 104. The subject may be moving or stationary. An operation on one device, called a leader device 111, operates one or more other devices, called client devices 112 and 113. An arbitrary device among multiple smart devices constituting the system can be set as a leader device.

In addition, each device can start and end shooting independently at an arbitrary timing. In this case, each frame taken in a common time zone maintains synchronization on the time axis. The independently captured data group can be edited as a sync-captured image and a sync-captured video (a "sync-captured" video, etc. mean a video, etc. captured by sync-capture) by retrieving data captured at a common time in post-processing.

Figure 2:
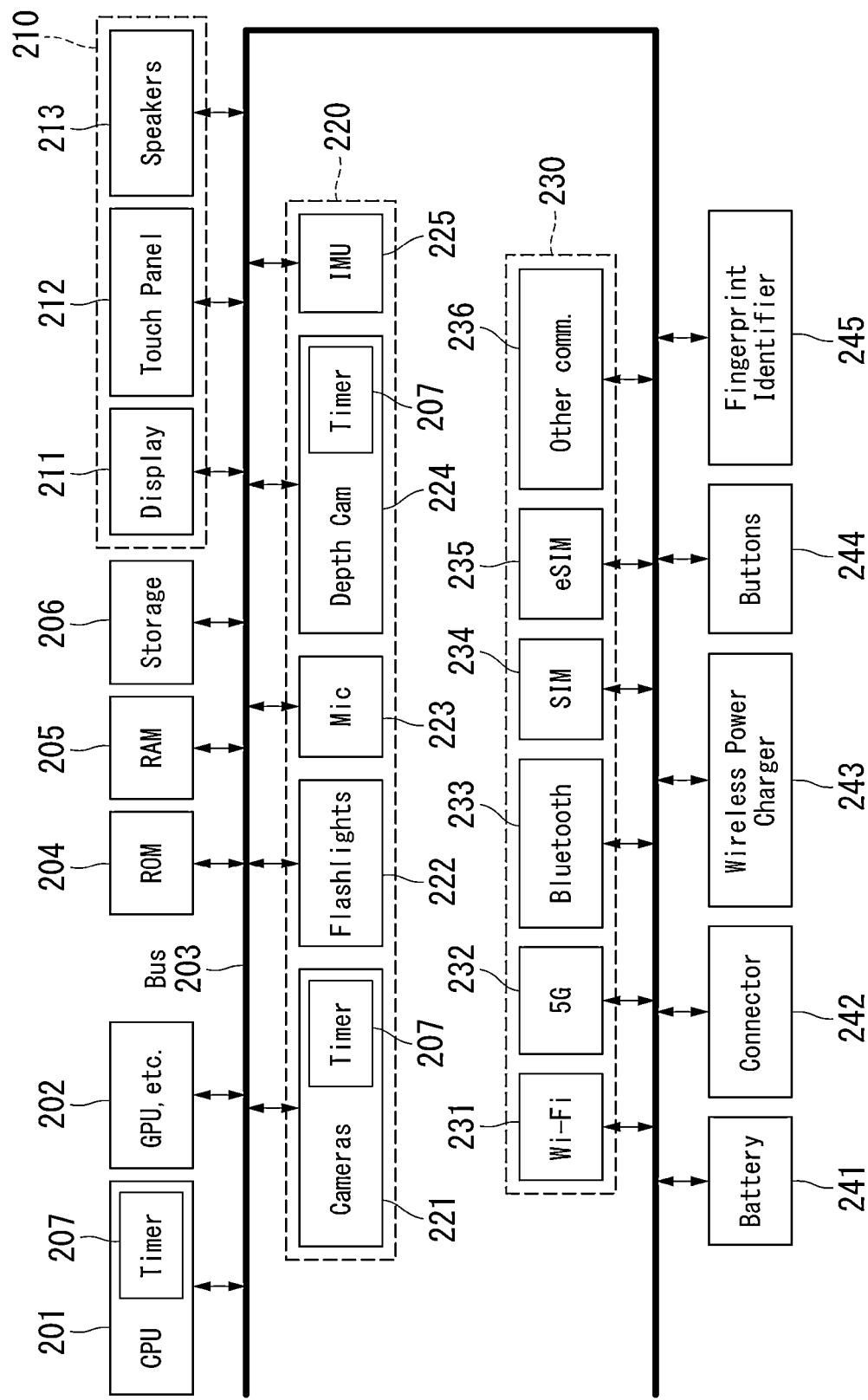
FIG. 2 shows a block diagram of a hardware configuration of a smart device 200.

FIG. 2 shows a block diagram of a hardware configuration of a smart device 200 for Embodiment 1 and Embodiment 2 described later. The smart device 200 may include a central processing unit (CPU) 201, arithmetic units other than the CPU such as a graphic processing unit (GPU), etc. 202, a bus 203, a read only memory (ROM) 204, a random access memory (RAM) 205, and a storage 206. A high accuracy timer 207 capable of defining the shooting time of its sensing-related devices (explained below) is usually provided inside the CPU 201. A display 211, a touch panel 212, and speakers 213 may be provided to a user as input and output interface devices 210.

A group of devices 220 is collectively referred to as sensing-related devices, including, but not limited to, one or more color imaging cameras (which consists of an optics, a sensor, a controller, an Image Signal Processor (ISP), a Mobile Industry Processor Interface (MIPI), etc.) 221, flashlights 222, microphones 223, depth cameras (with or without irradiation devices for active sensing) 224, an inertial measurement unit (IMU) 225, and the like. As a group of devices 230, collectively referred to as communication-related devices, the devices include, but are not limited to, a Wi-Fi communication module 231, a Fifth Generation (5G) mobile communication module 232, a Bluetooth communication module 233, a Subscriber Identity Module (SIM) module 234, an embedded SIM (eSIM) module 235, and other communication-related modules 236. In addition to these devices, the smart device 200 may include a battery 241, a set of connectors for power and communication cables 242, a wireless power charger device 243, buttons 244, a fingerprint identifier device 245, etc.

The CPU 201 controls the devices connected via the bus 203, the ROM 204 stores programs such as Basic Input/Output System (BIOS), and the RAM 205 is used as the main memory of the CPU 201, etc. The storage 206 is a large-capacity storage such as a flash memory that stores the data acquired by the sensor and calculated by the CPU. The touch panel 212, which is often integrated into the display 211, receives operations from the user to the smart device 200. The sensing-related devices 220 capture still images, continuously shot still images, video, audio, depth images, video of depth images, and the like. The communication-related devices 230 enable communication between multiple smart devices 200 and synchronize a timer 207 in each of the smart devices 200.

Figure 3:
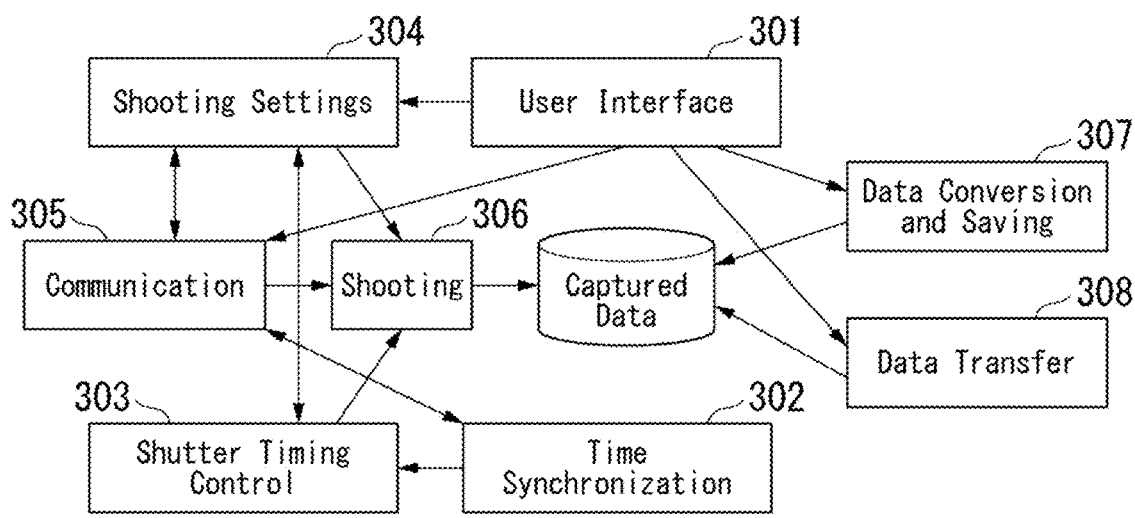
FIG. 3 shows a functional configuration of a sync-capture application 300.

FIG. 3 shows a functional configuration of a sync-capture application 300 for Embodiment 1 and Embodiment 2 described later.

The sync-capture application 300 running on the smart devices 200 includes, a user interface module 301, a time synchronization module 302, a shutter timing control module 303, a shooting setting module 304, a communication module 305, a shooting module 306, a data conversion and saving module 307, and a data transfer module 308. When these modules are executed by the CPU 201, etc., these modules make the CPU 201, etc. perform the following processing by controlling hardware components shown in FIG. 2.

The user interface module 301 shows the state of the other modules (not shown in FIG. 3 for simplicity) and the other smart devices' status participating in sync-capture, receives users' inputs and sends the event information about users' inputs to the other modules and the other devices through the communication module 305. Users can confirm and control shooting settings, the accuracy of synchronization, whether sync-capture is available or not, the start of shooting, the end of shooting, data storage, data transfer, and the like.

The time synchronization module 302 synchronizes a timer that defines the shooting time of multiple sensors in each smart device among the multiple smart devices. A single CPU timer value within each device is typically used as the basis for the time information. A typical timer can provide a value from nanoseconds to microseconds with an application programming interface (API) such as "SystemClock.elapsedRealTimeNanos( )" in Android operating system (OS). The timers can be synchronized to an absolute time, such as UTC (Coordinated Universal Time), or to a relative time based on the time of a device.

The system can use, instead of a CPU timer, a timer installed in the sensor itself or in the device that processes the sensor information, as a "sensor timer". In this case, these sensor timers need to be synchronized among multiple smart devices. Also, a value given by a conversion relationship, such as changing the unit of time from the time given by a timer, may be used as a time. There may be a single timer in a smart device, or there may be multiple timers in a smart device, such as one timer for each sensor. "Time sync" is achieved when the same definition of time information is given and controlled between the smart devices or sensors used for synchronized shooting.

The shutter timing control module 303 correlates the measured data by the sensor with the timestamp of the shooting time provided by the timer, and controls the shutter timing so that it matches the target shooting time.

To achieve sync-capture, the temporal information given to the data obtained by the sensor needs to have a strict and common definition of its relationship to the real-world time axis. Typically, it is the time at which the shutter opens and the time at which the shutter closes in a single shooting. This may be defined in other ways, such as "the time of the moment the shutter opens and the length of time the shutter is subsequently open" or "the length of time the shutter is open and the time at the moment the shutter closes".

The time lag between the device's own timer, the sensor's timer, the shutter opening/closing time in real time, and the timestamp that is appended to each shot needs to be strictly and commonly controlled. This is referred to as "real-time control of shutter timing based on the timestamp of the timer". Sync-capture is accomplished by synchronizing timers and providing real-time control of shutter timing based on the timestamps of the synchronized timers.

Two embodiments for controlling shutter timing will be explained later. In Embodiment 1, the method of precisely controlling the shutter timing indirectly using the phase adjustment by frame injection is described. In Embodiment 2, the method of direct control of the shutter timing based on the time of the sensor and the shooting setting is described.

The shooting setting module 304 is a module that enables manual adjustment by the user, adjustment by settings of the other device or automatic adjustment by each smart device, for various shooting settings, such as "3A". In general, the term 3A refers to the elements of Auto Exposure, Auto Focus and Auto White Balance, including exposure compensation, exposure time, sensor sensitivity, aperture, lens focus distance, autofocus target area, white balance, and whether or not automatic adjustment of each item is continued while continuous shooting. However, there are also other factors involved in shooting settings, such as, intensity and color of the flashlight, intensity of bokeh expression through image processing, high dynamic range (HDR), zoom and camera in use, image post-processing based on the image recognition results of the target image, composition suggestions and horizontal detection. Each of these adjustment elements has various parameters that can be adjusted automatically or by the user, and each adjustment has a significant impact on the image taken.

In the following, the term "shooting setting" is used as a generic term for any combination of automatic or manual adjustment of each parameter. The shooting settings may include one or more of: shooting time interval itself, target phase itself, image resolution, sensor type, exposure time, sensor sensitivity, focus distance, lens aperture, white balance, gamma correction, image un-distortion, image post-processing, image recognition by additional machine learning system, and the like. In the case of automatic parameter adjustment, the shutter timing control may be unstable depending on the implementation because of the calculation including image processing. One way to solve this is to implement it so that it is dedicated to synchronizing shutter timing after completing the desired shooting settings. There is also a method to implement simultaneous shooting setting-related calculations so as not to affect the synchronization of shutter timing. Embodiment 1 describes the case where the former is necessary, and Embodiment 2 describes the case where the latter condition is satisfied.

The communication module 305 communicates to the other devices participating in sync-capture through Wi-Fi, Wi-Fi Hotspot, Bluetooth, 5G and the like. It receives a user's operation from the user interface module 301. It also sends all related information such as timestamp used in the time synchronization module 302, shooting settings, commands to start shooting settings adjustment, commands to start phase alignment, commands to start still shooting, commands related to continuous shooting, and the like. It receives the settings and commands, and control the other modules in the device.

The shooting module 306 represents a module that captures images and that is implemented by each camera vendor or device vendor, other than shutter timing synchronization.

The data conversion and saving module 307 is a module that converts images and videos stored in RAM or storage in YUV or RAW format to any format such as JPEG, PNG, EXR, H.264, H.265, etc.

The data transfer module 308 is a module that transmits image and video data in a device to other smart devices, PCs, clouds, social networking sites, and other devices, or receives data from other devices.

In Embodiment 1 of the present disclosure, a leader-client configuration is described in which there is a single leader device and all client devices operate synchronously based on commands from that leader device. To synchronize the time between the sensors, a method using Wi-Fi or Wi-Fi Hotspot can also be used. As real-time control of the shutter timing based on the timestamp of the timer, the case of indirect real-time control by an improved method of the prior art is described. However, as mentioned earlier, it is emphasized that instead of Wi-Fi or Wi-Fi Hotspot, it is also possible to use high-precision time synchronization of a large number of devices using 5G URLLC (Ultra-Reliable Low Latency Communications).

Figure 4:
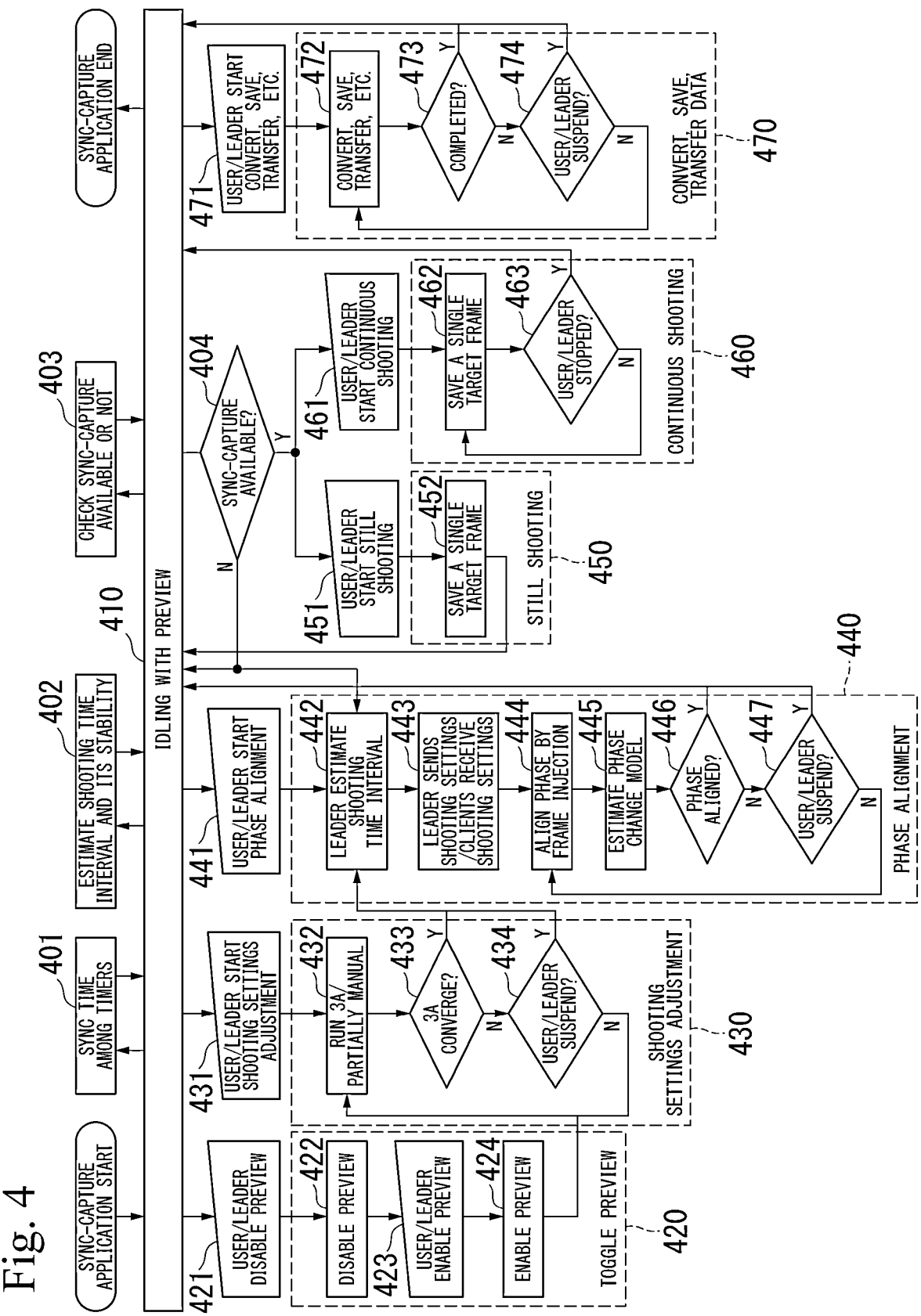
FIG. 4 shows an overall flowchart of a sync-capture application 400 according to Embodiment 1.

FIG. 4 shows an overall flowchart of a sync-capture application (400) according to Embodiment 1.

After the sync-capture application is started, the smart device 200 is in an idle state while displaying preview (410). In this state, the time synchronization module 302 synchronizes times of all timers (402), by communicating with the other devices via the communication module 305. In addition, the time synchronization module 302 confirms whether sync-capture is available in the current shooting settings or not (403). It estimates parameters related to sync-capture, and the parameters' stability (402). Typically, it measures the shooting time interval multiple times, calculates the average and standard deviation of the measured shooting time intervals and confirms its stability based on the standard deviation. If the shooting time interval is stable enough, the value is used as a parameter of sync-capture.

Toggle preview (420) is a feature to toggle ON/OFF the preview of all devices by an easy operation on the leader device, in the configuration where there is distinction between the leader device and the client devices (user operations to set the smart device as the leader device or the client device are the same as processes 631 and 634 in FIG. 6 which will be explained later). It does not take any pictures and does not do any calculations, in order to save battery consumption on all devices. It improves convenience of this system by the toggle operations on many devices. Note that this feature is not required in the configuration where there is no distinction between the leader device and the client devices because termination or interruption of an application on an individual device corresponds to this feature.

If the user disables the preview (421) by, for example, operating the touch panel 212, or the smart device 200 is the client device and receives a command to disable the preview (421) from the leader device, the smart device 200 disables the preview (422). Subsequently, if the user enables the preview (423) by, for example, operating the touch panel 212, or the smart device 200 is the client device and receives a command to enable the preview (423) from the leader device, the smart device 200 enables the preview (424), and the process proceeds to 432.

Shooting settings adjustment (430) is a feature to set the leader device's shooting settings to all client devices, or adjust the shooting settings by either automatic or partial manual settings. While the leader device and the client devices may shoot based on their own shooting settings, there are cases when it is useful to share the leader's settings with all clients. Like in the idling with preview (410), it is also possible to estimate whether sync-capture is available under the adjusted shooting settings and the parameters required for sync-capture, in parallel.

For example, if the smart device 200 is the leader device, it runs 3A (Auto Exposure, Auto Focus and Auto White Balance) automatically or partially manually (432). The smart device 200 continues 3A until it converges ("Y" at 433) or this process is suspended ("Y" at 434). If 3A converges, the smart device 200 sends 3A setting to all the client device.

Phase alignment (440) is a feature to reduce the phase error of shooting time on the order of microseconds by repeating the frame injection process. Unlike the prior art implementation, users can expect to minimize the phase error of the shooting time in any model, by modeling the change of the phase error due to the frame injection process and estimating the parameters at runtime. In this way, each preview image on all smart devices will be an image acquired by sync-capture.

The leader device estimates shooting time interval (442), and sends shooting settings to the client devices (443). The client devices receive the shooting settings (443), and align phase by frame injection (444) until the phase is aligned ("Y" at 446) or this process is suspended ("Y" at 447).

Still shooting (450) is a feature to take only one image. It sends a timestamp of the image to be saved from the leader device to all client devices. On a leader device and all client devices, a single image taken immediately before or after the timestamp is stored in memory or storage. By buffering not only the latest image displayed on the preview screen but also an arbitrary number of frames back to the present, it is possible to save the image at the specified time, independent of the user's UI operation delay and communication time lag.

Continuous shooting (460) is a feature for taking the images continuously. As in the case of still photography, the leader device sends the start time and end time of the save to all client devices. The images taken between the start and end times on the leader device and all client devices are stored in memory or storage. It is also possible to create a video from these sequentially captured images.

Convert, save, transfer data (470) is a feature to allow the user to change the image storage format, save images stored in RAM to storage, and send images to other devices, such as other smart devices, PCs, the cloud, and social networking sites.

FIGS. 5A to 5D are diagrams describing the process of achieving sync-capture in Embodiment 1, in the form of a timing chart for multiple devices. The following explains the case of synchronization using the frame injection method in a leader-client configuration as an example of sync-capture.

Figure 5A:
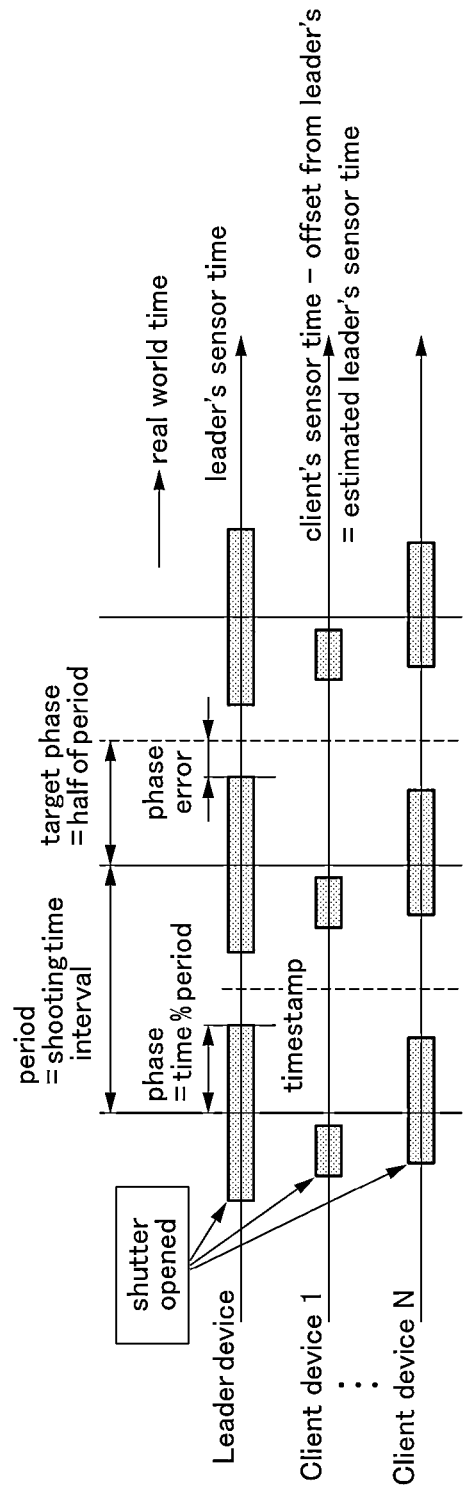
FIG. 5A shows a situation in which the devices have completed time synchronization with Wi-Fi or Wi-Fi Hotspot.

FIG. 5A shows a situation in which the devices have completed time synchronization with Wi-Fi or Wi-Fi Hotspot. "Sensor time offset from leader's" in each client device (client phone) is estimated.

The horizontal axis represents the time axis of the real world. In this case, the time of the timer of the leader device is regarded as the real world time. The timer time of each sensor in a sync-capture system has an error from the real world time, but it can be corrected by communication for time correction such as SNTP, Network Time Protocol (NTP) and Precision Time Protocol (PTP). In order to use the timer time of the leader device as a common real world time in each client device, each client device estimates the timer time of the leader device based on the local time of the client device and the time difference between the leader device and the client device acquired during the communication for the time correction.

The rectangle on the time axis represents the exposure time when the shutter is open. In this example, the timestamp of the time at the moment the shutter is closed is defined as the shooting time attached to the shooting data. The definition of sync-capture is that all sensors shoot at the same time for a certain space at a certain moment in the time axis of the real world.

The preview function, which mimics a camera's viewfinder, is achieved by repeating the shooting at certain shooting time interval. This shooting time interval and the aforementioned shooting time are used to define the value that is called "phase". In this case, the phase is defined as the remainder obtained by dividing the time stamp, which represents the shooting time in a particular order, by the shooting time interval. One of the definitions of sync-capture in continuous shooting is to ensure that the shooting times of all the sensors are in the same phase on a real-world time axis. This common target value phase is called the target phase. In this case, the target phase is defined as the value of half of the shooting time interval.

If the shooting time interval is not real-time controlled, the shooting time interval may vary depending on exposure time and the shooting settings. The application measures the shooting time intervals multiple times and determines that the correct sync-capture can be performed using the average value only if the standard deviation is less than the target error.

As a real-world time axis, any timer can be used, such as a timer from TAI, UTC, GPS, or GMT, a commonly accessible local 5G communication device, a time presentation device, or a leader device timer. In addition to the moment when the shutter closes, the moment when the shutter opens or the center of the exposure time may be used as the shooting time. The shooting time interval may be set by the user or programmer, or it may be determined automatically based on various shooting settings. Alternatively, the sensor can be controlled in real time to maintain strict shooting time intervals of 30 Hz, 60 Hz, and 120 Hz, making it compatible with today's widely used video formats. The phase can also be defined more generally as a value that can define the error of shooting time between multiple devices. Any value greater than or equal to 0 and less than the shooting time interval can be used as the target phase, rather than the median of the shooting time interval. For both definitions, it is essential for sync-capture to use the same definition for all sensors.

Figure 5B:
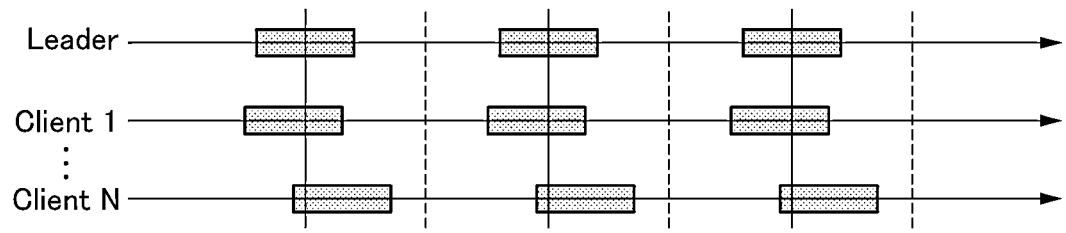
FIG. 5B shows the shutter opening/closing timing after the exposure time has been set by adjusting the exposure time by 3A or by manual setting.

FIG. 5B shows the shutter opening/closing timing after the exposure time has been set by adjusting the exposure time by 3A or by manual setting (shooting settings adjustment (430) in FIG. 4). At this stage, not only auto exposure but also auto focus and auto white balance can be executed at the same time. Also, each shooting parameter can be set to a manual value.

The user of the sync-capture application can freely set the exposure time within certain constraints. When the user sets the exposure time, there is an unpredictable time lag between the application UI and the completion of the hardware configuration. However, once the exposure time and a shooting time interval are set in the sensor controller, the sensor and the sensor controller can and must be able to precisely maintain a certain value without causing a time lag. In addition, it is possible to obtain the time of shooting without an unpredictable time lag and to accurately evaluate the error from the real world time.

Figure 5C:
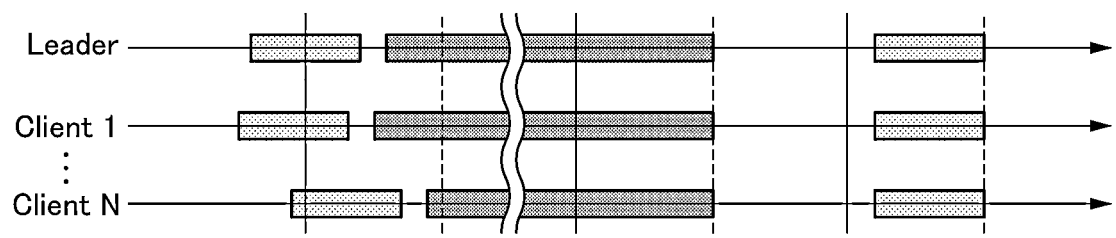
FIG. 5C shows an improved "frame injection" method.

FIG. 5C illustrates an improved "frame injection" method. Frame injection refers to the injection of a single shot with a different exposure time, between repetitions of shooting to compose the preview. This figure shows the case of an accurate and successful frame injection (the second frame in each horizontal line). The phase is out of phase before the frame injection, but after the frame injection, the phase coincides with the target phase. In the usage scenario shown in FIG. 1, the shooting start time and the shooting end time coincide between the smart devices 111, 112 and 113.

In the prior art implementation, it needs to adjust five parameters manually related to sync-capturing for various shooting settings of various devices. The parameters are as follows.

Shooting time interval: It depends on each phone model and shooting settings. However this value needs to be adjusted manually in the prior art. The system in an embodiment measures actual shooting time intervals multiple times, and gets the average and the standard deviation of them. Only while the standard deviation is small enough (ex. 10 microseconds), the system in an embodiment decides sync-capture is available, and uses the average as the actual shooting time interval in the current shooting settings Target phase: The application tries the frame injection so that the phase becomes equal to this target phase. The prior art uses approximately half of the shooting time interval. The system in an embodiment always uses half of the shooting time interval Alignment threshold: The threshold to decide whether the phase error (phase−target phase) is small enough or not. The prior art uses 100 to 200 [μs]. The system in an embodiment uses 10 to 30 [μs]

Minimum exposure time: When the exposure time of a frame injection is smaller than a certain value—(basically equal to shooting time interval), the frame injection does not have the expected effect which is to fix the phase error. The prior art uses approximately the shooting time interval. The system in an embodiment uses twice the shooting time interval Overhead: It is called δ. This value highly depends on each phone model. In the experiments, performing a single frame injection with a setting of "exposure time is T" causes two shootings. The elapsed time of one of the shootings is A, and the elapsed time of another of the shootings is B. Thus, the total elapsed time is A+B. Additionally, A+B is equal to 2T+δ. In order to reduce the phase error to 0, the value of T is set so that {phase error}+2T+δ is equal to {integer multiple of shooting time interval}

The paper of the prior art says, "For example, on one phone model, we empirically found that exposures of length T+δ/2 would shift the phase by 2T+δ". However, the inventors found that exposures of length T shifts the phase by 2T+δ. On HUAWEI P30 lite, δ is 1.820 [ms]. Thus this improvement in the phase shift model can reduce the synchronization error on millisecond-order on some smartphones.

In order to calculate T, δ must be correct. However this value is needed to be adjusted manually in the prior art. The system in an embodiment estimates this value automatically. T is controllable, and A+B=2T+δ. This system monitors the elapsed time of every shooting. This system performs a single injection of T and finds the shootings in which the elapsed times are A (much shorter than normal) and B (much longer than normal).

Figure 5D:
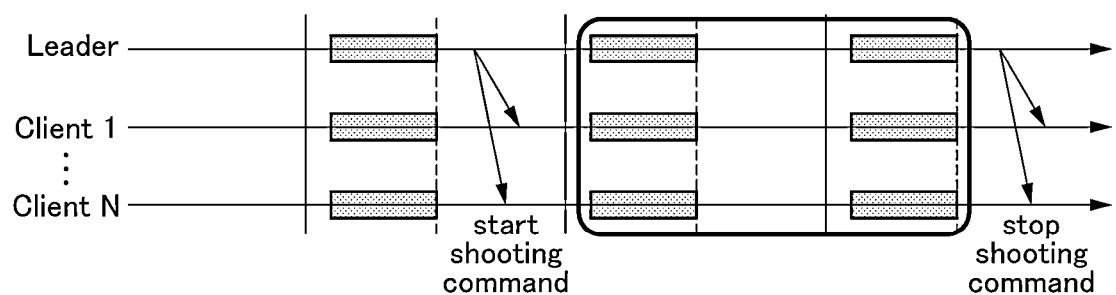
FIG. 5D shows the preview state where the phase matches the target phase.

FIG. 5D shows the preview state where the phase matches the target phase (after phase adjustment (440) in FIG. 4). The leader device can send the shooting start time and the shooting end time to the client devices. In the usage scenario shown in FIG. 1, the smart devices 111, 112 and 113 shoot the subject 104 during this period. The captured data is saved into its RAM or its storage.

The technical effects of Embodiment 1 of the present disclosure are as follows:

As with wired digital single-lens reflex (DSLR) camera-based systems, the total shutter time control accuracy for wireless sync-capture is better than 1 [ms] with multiple computing devices that support camera functions.

Automatic parameter adjustment for any shooting settings of any camera models. The prior art does not have this feature. Through experiments, the accuracy of the injection δ (Overhead) is improved.

3A (auto exposure, auto focus and auto white balance) is possible. 3A can make the shooting time interval unstable and that interferes with sync capture. However, the method in embodiment 1 has solved this problem.

Unlike the prior art, continuous shooting is possible in Embodiment 1 of the present disclosure.

The improvements of Embodiment 1 of the present disclosure compared with the prior art are as follows:

It achieves better than 1 [ms] accuracy in total shutter timing control of wireless synchronized capturing by multiple camera-enabled computing devices, same as wired DSLR camera based system.

In various phone models and in various shooting settings, the parameters are automatically tuned. The prior art does not have this feature. The accuracy of "overhead" of injections is improved based on experiments 3A (Auto Exposure, Auto Focus and Auto White Balance) becomes available by Embodiment 1 of the present disclosure. 3A can make the shooting time interval unstable, so it disturbed synchronized capturing. However, the method of Embodiment 1 has solved this problem Continuous shooting becomes available, unlike the prior art.

Figure 6:
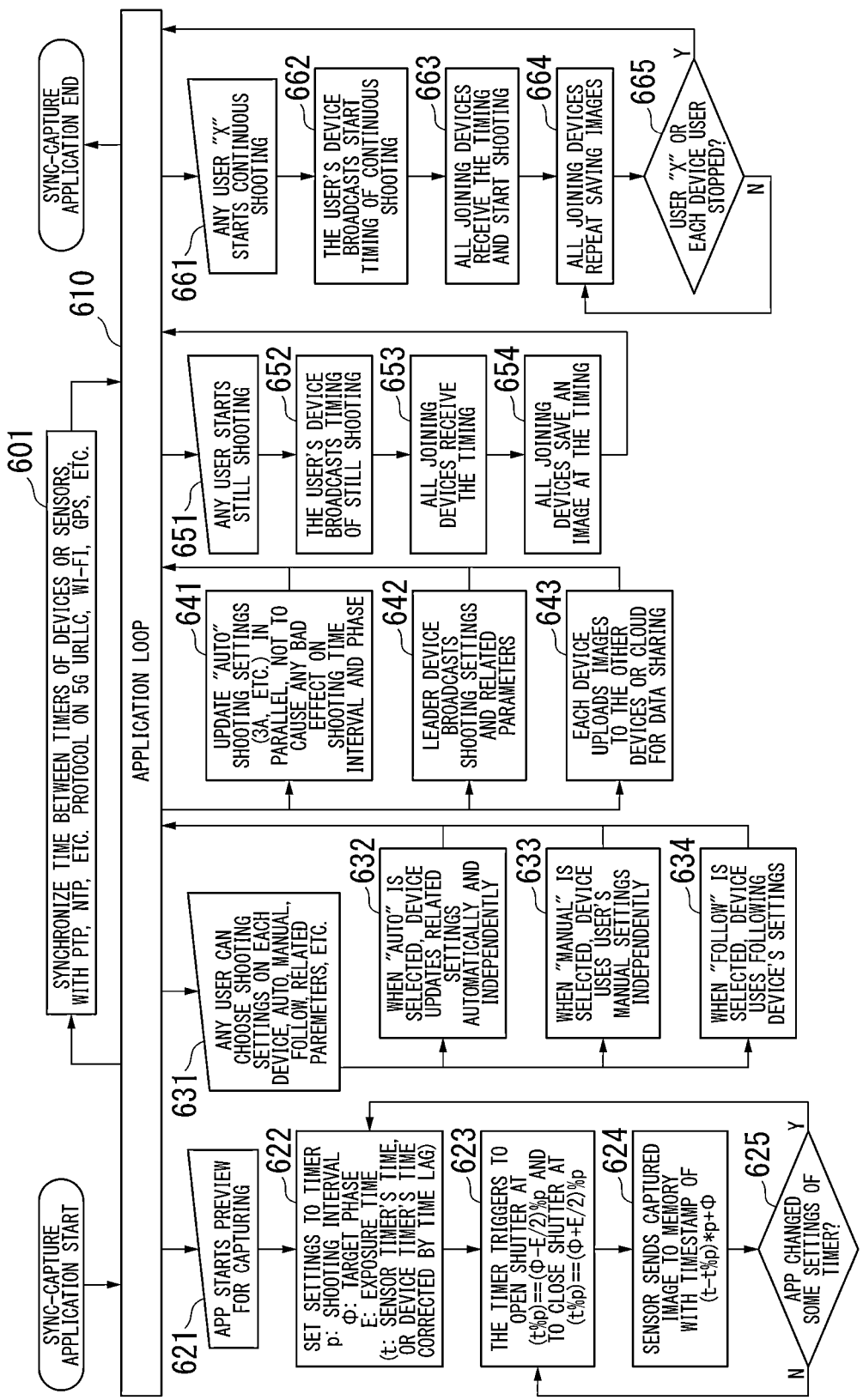
FIG. 6 shows an overall flowchart of a sync-capture application 400 according to Embodiment 2.

FIG. 6 shows an overall flowchart of a sync-capture application 400 according to Embodiment 2. Here, there is no distinction between a leader device and the client devices, and each device can start and end shooting independently. However, an arbitrary device transmits a shooting request to the other client devices participating in sync-capture, so that the devices can simultaneously start and end sync-capture. For time synchronization between sensors, it uses 5G URLLC, which is designed to synchronize a large number of devices. The camera does not use the frame injection method, but uses real-time controlled shutter timing based on a timer that is precisely synchronized with the real world time.

The only parameters that should be kept in common across all devices are the shooting time interval, the target phase, and the exposure time. Differences in focus distance, exposure compensation, white balance, etc. are acceptable for each device. Control to maintain the shooting time interval and zero phase error is paramount, even when shooting settings, image processing, and information displaying are operating.

However, the exposure time can be different for each imaging device to the extent permitted by the user and the intended use of the sync-capture media data. In addition, shooting time intervals with multiple relationships, such as 15 Hz for device A, 60 Hz for device B, and 960 Hz for device C, are also acceptable for purposes such as absorbing differences in shooting ability among devices and realizing slow motion video from a viewpoint.

In the Idling with Preview mode in Embodiment 1, preview is displayed while simultaneously performing any of the processes performed in the modes of Idling, Shooting settings adjustment, and Phase alignment. In Embodiment 2, the application 400 may use 5G URLLC to achieve high-precision time synchronization with a reference timer (601). In the background, the precise shutter timing control by time synchronization and direct real-time control required for precise synchronized shooting is already in place, so that the system is always ready to realize precise synchronized shooting with a large number of smart devices at any given time.

In Embodiment 1, in order to cope with the problem where the shooting time interval is not constant due to the image processing required for 3A, etc., a method of phase matching is used after the completion of 3A or after the end of 3A by the user, and 3A is not executed at the time of shooting. In Embodiment 2, however, it is emphasized that even when 3A and image processing are performed concurrently, the conditions for sync-capture are satisfied if precise real-time control of the shooting time interval and zero phase error is always realized with the highest priority. In both cases, it shows the user that sync-capture is possible with precise real-time control of the shooting time interval and zero phase error.

Still Shooting, Continuous Shooting, and Convert, Save & Transfer features (not shown in FIG. 6) have the same functions as Embodiment 1.

For example, if the user operates the touch panel 212 to start the sync-capture application 300, the CPU 201, etc. performs an application loop (610).

For example, soon after the application starts, or after if the user operates the touch panel 212 to start preview for capturing, the CPU 201, etc. start preview for capturing (621). If a sensor (for example, a camera 221 in FIG. 2) does not have its own timer, the sensor uses a device timer (for example, a CPU timer 207 in FIG. 2) with time lag correction. The CPU 201, etc. set the timer to trigger the sensor to open its shutter at the time when (t % p) is equal to ($\varphi$−E/2) % p, and to close its shutter at the time when (t % p) is equal to ($\varphi$+E/2) % p (623), so that the sensor sends captured images to memory with a timestamp of (t−t % p)*p+$\varphi$ (624), where t is the timer's time, p is the shooting time interval, $\varphi$ is the target phase, E is the exposure time length, and % means MOD operation (622). When the users or the application 300 changes the related settings, the settings are set to those of the timer again, and the process proceeds to 622, otherwise the process proceeds to 623.

For example, in order to let users select "Auto", "Manual", "Follow", following device, and related parameters, a user interface is shown on the display 211. Any user can choose shooting settings on each device (631). When "Auto" is selected, the device updates related settings automatically and independently (632). When "Manual" is selected, the device uses user's manual settings independently (633). When "Follow" is selected, the device uses following device's settings (634).

The following device (for example, the smart device 111 in FIG. 1), which is selected by "a certain device" (for example, the smart devices 112 and 113 in FIG. 1) on which "Follow" is selected at 634, is the leader device for "a certain device". The leader device broadcasts shooting settings and related parameters (642).

The CPU 201, etc. update "AUTO" shooting setting (3A, etc.) in parallel, not to cause any bad effect on shooting time interval and phase (641).

Each device uploads images to the other devices or cloud for data sharing (643).

In order that any users can do synchronized still capturing and continuous capturing with the sync-capture joining devices and share the captured images, user interfaces are displayed so as to start still shooting and continuous shooting (video shooting) on all devices. When any user operates some user interface to start shooting, the device broadcasts the shooting start commands with target timestamp to all sync-capture joining devices. All devices keep recent captured images on its memory for a while, in order to save the captured images on its memory to its storage when necessary. When a device receives a shooting start command or a shooting stop command, the device saves the target images to its storage. Any devices can send the saved images to the other devices or cloud for data sharing.

For example, if any user starts still shooting (651), the user's device broadcasts the timing of still shooting (652), all joining devices receive the timing (653), and save an image at the timing (654). If any user (user "X") starts continuous shooting (661), the user's device broadcasts the start timing of continuous shooting (662), and all joining devices receive the timing and start shooting (663), and repeat saving of images (664). If the user "X" or the other device user stops the continuous shooting ("Y" at 665), the process returns to 610, otherwise, the process returns to 664.

FIG. 7A to 7D are diagrams describing the process of sync-capture in Embodiment 2, in the form of a timing chart for multiple devices. FIG. 7E shows sync-capture by phones which uses different FPS (frame per second) in multiple relationship.

FIG. 7A shows the state in which the multiple devices participating in the sync-capture have completed time synchronization with PTP or similar time-sync protocols on 5G URLLC, but shutter timing has not been controlled yet.

The horizontal axis represents the time axis of the real world. In this case, the timer of a 5G communication device synchronized to UTC is considered as a reference to the real world time. "sensor time minus offset from the real world time" can be used as the estimated real world time every time. However in this case, the time of the sensor's timer can also be matched to the real world time, within a certain margin of error. The required specification for 5G URLLC is that this time-sync error should be less than 1 millisecond. Depending on the communication environment, with the current hardware implementation, 300 devices can be synchronized with an error of less than 10 nanoseconds.

The rectangle on the time axis represents the exposure time when the shutter is open. Unlike Embodiment 1, in this case, the central time between the time when the shutter opens and the time when the shutter closes is defined as the shooting time attached to the shooting data.

The preview repeats the shooting at a regular shooting time interval. The phase is defined as the remainder obtained by dividing the shooting time by the shooting time interval. Sync-capture is achieved by ensuring that all the devices' shooting times have the same phase in the real-world time. The common target value of the phase is the target phase. In this case too, the median value of the shooting time interval is defined as the target phase. Instead of the median value of the shooting time interval, any value above 0 and below the shooting time interval can be used, as the target phase. However, the same definition must be used for all sensors.

Figure 7B:
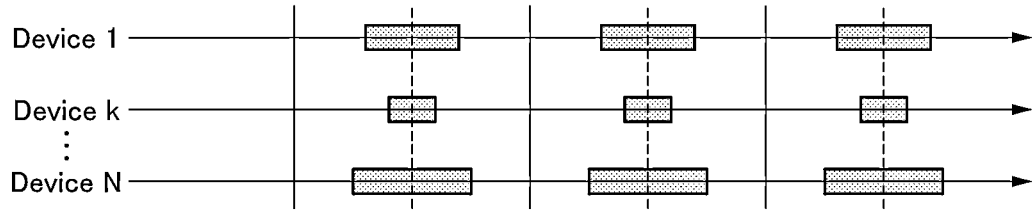
FIG. 7B shows the state in which sync-capture is controlled to be feasible based on the respective shooting settings.

FIG. 7B shows the state in which sync-capture is controlled to be feasible based on the respective shooting settings.

In Embodiment 1, it may not be possible to maintain a constant shooting time interval while the 3A is taking place. To avoid this problem, after 3A convergence (or suspending), if consistency of the shooting time interval is confirmed, it starts the phase alignment. In Embodiment 2, unlike Embodiment 1, even while performing 3A, sensor related firmware and hardware perform hard real-time control of the shutter open/close timing directly, in order to give top priority to keeping the shooting time interval and the phase synchronization.

When it takes a single preview image, it can perform 3A and scene recognition based on that image. The calculation time may be longer than the shooting time interval. In such cases, the software and firmware can perform the necessary calculations for each of the multiple images taken and control the hardware associated with the imaging conditions in parallel. Embodiment 2 does not perform the frame injection that was done in Embodiment 1.

Figure 7C:
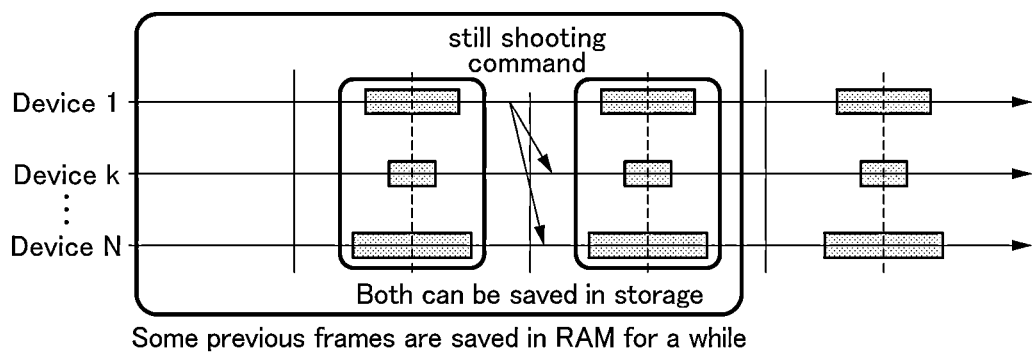
FIG. 7C shows a process in which Device 1 sends a request to all the other devices participating in the sync-capture to save an image.

FIG. 7C shows a process in which Device 1 sends a request to all the other devices participating in the sync-capture to save an image at a specified time t1 (the starting point of the two arrows coming out of the Device 1 timeline), and all the devices participating in the sync-capture (for example, the smart devices 111, 112 and 113 in FIG. 1) save an image at a time closest to time t1 (these processes correspond to 651 to 654 in FIG. 6).

The communication associated with sync-capture is sufficiently fast compared to the frame capture interval. However, the time lag between the start of the shooting operation on one device and the shooting on the other device may cause a one-frame gap. In Embodiment 1, this problem was avoided by creating a time difference between the shooting start operation at the leader device and the common shooting start time. However, in some cases, it is rather necessary to shoot back in time from the shutter release to capture the "best moment". An easy way to achieve this is to store frames from a certain amount of time in the past in memory in advance on multiple devices (frames in a large rounded rectangle in FIG. 7C).

Figure 7D:
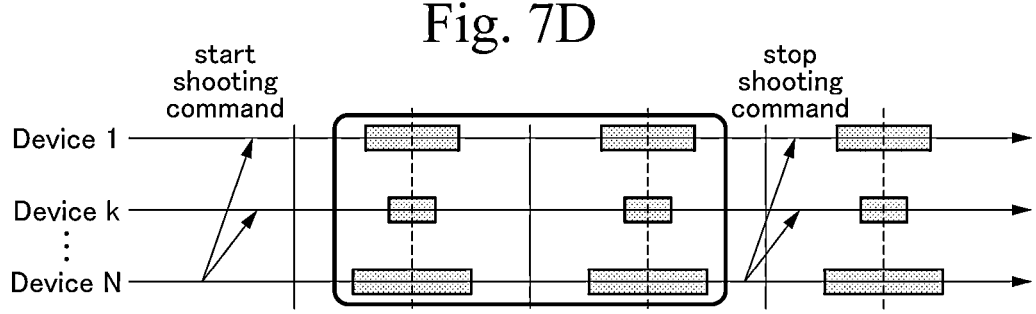
FIG. 7D shows a process in which Device N sends a request to all the other devices participating in the sync-capture to save continuous shooting images.
Figure 7E:
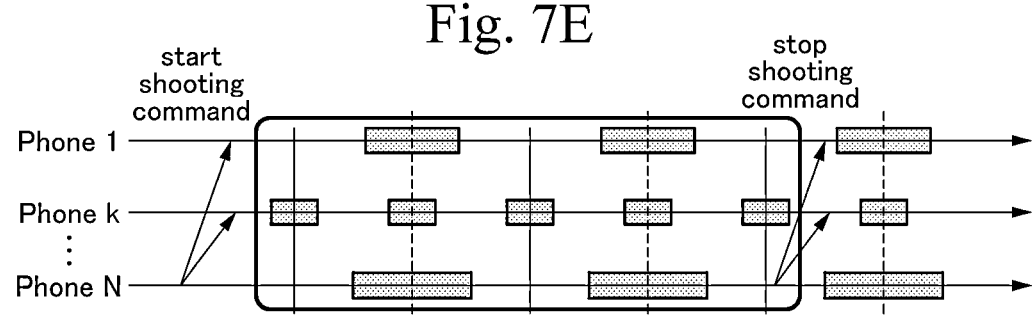
FIG. 7E shows a situation of capturing by phones which use different FPS in multiple relationship.

FIG. 7D shows a process in which Device N sends a request to all the other devices participating in the sync-capture to save continuous shooting images between the specified start time t1 and the specified end time t2, and those images are saved on all the devices (for example, the smart devices 111, 112 and 113 in FIG. 1, and these processes correspond to 661 to 665 in FIG. 6).

In Embodiment 1, depending on the device model and the shooting conditions, the shooting time interval often is not a multiple of 30, such as 25 Hz or 27 Hz. However, in Embodiment 2, the shutter is controlled to open and close to use common shooting time intervals, such as 30 Hz, 60 Hz, 120 Hz, and 240 Hz, so as to make it compatible with current widely-used video formats. In addition, the ability to synchronously shoot normal and slow-motion video may be useful. Suppose one camera A shoots at 60 Hz and another camera B shoots at 240 Hz. This function can be accomplished by controlling the shutter of camera B so that camera B also shoots synchronously at the time when camera A is shooting. FIG. 7E shows such a situation of image capturing by phones which use different FPS in multiple relationship.

Sync-capture is possible not only for color images and videos, but also for color images with different FOV (field of view) and depth images combinations, for shooting with multiple sensors on a single device, and for videos with high frame rates in excess of 1000 FPS. By matching the definition of synchronization, sync-capture can be realized between different types of devices.

The technical effects of Embodiment 2 of the present disclosure compared with the prior art are as follows.
Since the shooting time interval and phase are guaranteed in hard real-time, sync-capture can be achieved even when using different shooting settings between different device models
The time synchronization and shutter timing control based on each sensor time are independent. Thus, it is possible to achieve sync-capture by approximately 300 devices only by time synchronization over 5G URLLC, with an accuracy of 10 to 100 microseconds The improvements of Embodiment 2 of the present disclosure compared with the prior art are as follows:
In the prior art, the number of devices which can participate in sync-capture is limited to about 10. In Embodiment 2, it is possible to achieve sync-capture by approximately 300 devices, with an accuracy of 10 to 100 microseconds
In the prior art, the selectable shooting time interval is limited. In Embodiment 2, users can do sync-capture, using commonly used video frame rates, such as 30 Hz and 60 Hz
There are cases that need one single leader device such as a special remote controller in the prior arts. In Embodiment 2, any devices can send requests for sync-capture to the other devices participating in sync-capture
For devices which do not have direct real-time control of shutter timing, in run-time, it estimates parameters and models related to sync-capture and whether sync-capture is available or not. This allows sync-capture to become available in various shooting settings on various camera-enabled computing devices.
It gives top priority to keeping a constant shooting time interval and zero phase error based on the time of each sensor, by direct real-time control of shutter timing. That simplifies the problem of sync-capture by numerous sensors to time synchronization of numerous sensors.

For time synchronization of numerous sensors, it uses PTP or similar protocols over 5G URLLC, so that numerous camera-enabled computing devices can participate to sync-capture.

The effects of the present disclosure are as follows:

The disclosure realizes the ability of camera-enabled computing devices to use wireless sync-capture, with microsecond order accuracy in total shutter timing synchronization. By estimation of parameters related to sync-capture in run-time, parameter tuning by hand in the prior art becomes unnecessary.

Using PTP or similar time synchronization protocol over 5G URLLC, it synchronizes the time of numerous sensors. By direct or indirect real-time control of shooting time interval and phase of shooting based on the time of each sensor, Sync-capture by numerous camera-enabled computing devices can be available.

There is a method to synchronize the time of a sensor on the order of microseconds by using radio waves such as GPS and a hardware implementation of PTP. However, in the case that the radio waves are difficult to reach indoors, the radio waves of GPS are unstable, and the device does not have PTP hardware implementation, the Wi-Fi communication and 5G communication methods proposed in this disclosure are useful.

What is disclosed above are merely exemplary embodiments of the present disclosure, and are certainly not intended to limit the protection scope of the present disclosure. One of ordinary skilled in the art may understand that all or some of the processes that implement the foregoing embodiments and equivalent modifications made in accordance with the claims of the present disclosure shall fall within the scope of the present disclosure.

What is claimed is:

1. A smart device for use in a system comprising a plurality of smart devices, the smart device comprising:
   one or more image sensors,
   a communication device,
   a processor; and
   a memory coupled to the processor to store instructions, which when executed by the processor, cause the processor to:
   synchronize a time of one or more timers of the smart device or the image sensors among the plurality of smart devices, based on a protocol for time synchronization on wireless communication by using the communication device; and
   control a timing of shutter opening and closing timing of each image sensor based on the synchronized time, wherein the timing is adjusted to keep consistent shooting time interval and phase, wherein the phase is a remainder obtained by dividing shooting time by the shooting time interval.

2. The smart device according to claim 1, wherein shooting settings are adjusted by a user manually or adjusted by the user partially after auto adjustment shooting settings, comprising one or more of:
   shooting time interval itself, target phase itself, image resolution, sensor type, exposure time, sensor sensitivity, focus distance, lens aperture, white balance, gamma correction, image un-distortion, image post-processing, or image recognition by additional machine learning system.

3. The smart device according to claim 1, wherein the instructions further cause the processor to:
   attach a timestamp of the timer of the smart device or the image sensor to each image according to a consistent rule;
   measure elapsed times between adjacent captured frame timestamps;
   get an actual shooting time interval by averaging of measured elapsed times; and
   confirm stability of shooting time interval by checking if variance of measured elapsed times is smaller than a predetermined threshold.

4. The smart device according to claim 1, wherein the instructions further cause the processor to:
   perform injection shooting with some exposure time lengths and then measure an actual phase shift length;
   test multiple injection shots with different exposure time length, and clarify a model of a relationship between injection length and phase shift length in run-time under some shooting settings; and
   if the model of the relationship is fixed for some types of smart devices and some shooting settings, calculate inversely a best exposure time length of an injection shot from a current phase error.

5. The smart device according to claim 4, wherein when different elapsed time after the injection shot appears and the time lengths are A and B, A is smaller than constant shooting time interval, B is larger than the constant shooting time interval, both of A and B appear only once after the injection shot, A+B is equal to $2T+\delta$, and T is a controllable injection shot time length and $\delta$ is device-specific constant time length, the instructions causing the processor to:
   get the constant shooting time interval and check its stability by measuring the shooting time intervals multiple times;
   measure A+B after the injection shot in which length of shooting time is T;
   obtain an average value of $\delta$ by multiple values calculated by $A+B-2T$, and check the stability of $\delta$;
   obtain the current phase error $\delta$ equal to phase minus target phase which is half of the shooting time interval;
   obtain T so that $\varepsilon+2T+\delta$ is equal to integral multiplication of shooting time interval; and
   perform an injection shot in which length of shooting time is T, to make phase error zero.

6. The smart device according to claim 1, wherein when the smart device is selected by one or more other smart devices, the instructions further cause the processor to:
   perform an automatic adjustment of shooting settings and wait for conversion of the shooting settings;
   measure an adjustment result;
   broadcast the adjustment result to one or more other devices, to capture with the same shooting settings by the plurality of smart devices;
   periodically determine a phase error at each smart device; and
   when a user starts still capturing or continuous capturing, capture images synchronously among all the smart devices, wherein shooting time intervals are the same and phase error is zero.

7. The smart device according to claim 1, wherein when the smart device selects other smart device, the instructions further cause the processor to:
   receive a result of automatic adjustment of shooting settings from the other selected device, to capture with the same shooting settings by the plurality of smart devices;
   periodically determine a phase error at each smart device; and when a user starts still capturing or continuous capturing, capture images synchronously among all the smart devices, wherein shooting time intervals are the same and phase error is zero.

8. The smart device according to claim 1, wherein the instructions further cause the processor to:
display a user interface to let a user select "Auto", "Manual", or "Follow", a following device, and related parameters, for each setting item and parameter of shooting settings; and
when "Auto" is selected, update related settings automatically and independently;
when "Manual" is selected, use user's manual settings independently; or
when "Follow" is selected, use following device's settings.

9. The smart device according to claim 1, wherein when the system can control shutter open/close timing directly in real-time, to realize synchronized capturing, the instructions further cause the processor to:
synchronize times between timers of devices or sensors based on a protocol for time synchronization on wireless communication by using the communication device;
if the image sensor does not have its own timer, use a smart device timer with time lag correction;
set the timer to trigger the image sensor to open its shutter at the time when (t % p) is equal to (φ−E/2) % p, and to close its shutter at the time when (t % p) is equal to (φ+E/2) % p, so that the image sensor sends captured image to memory with a timestamp of (t−t % p)*p+φ, wherein t is timer's time, p is shooting time interval, φ is target phase which is half of the shooting time interval, E is exposure time length, and % means MOD operation; and
when users or a program changes the settings, set the changed settings to those of the timer again.

10. The smart device according to claim 1, wherein the instructions further cause the processor to:
display a user interface to start still shooting and continuous shooting on all the smart devices;
when a user operates the user interface to start shooting, broadcast the shooting start commands with a target timestamp to all the smart devices participating in sync-capture;
retain recent captured images by any of the smart devices on its memory for a period of time, to save the captured images on its memory to its storage when necessary;
when the smart device receives shooting a start command or a shooting stop command, save target images to its storage; and
send the saved images to other devices or cloud for data sharing.

11. A wireless synchronized image capturing system, comprising:
a plurality of smart devices, each smart device, comprising:
one or more image sensors,
a communication device,
a processor; and
a memory coupled to the processor to store instructions, which when executed by the processor, cause the processor to:
synchronize a time of one or more timers of the smart device or the image sensors among the plurality of smart devices, based on a protocol for time synchronization on wireless communication by using the communication device; and
control a timing of shutter opening and closing timing of each image sensor, to keep constancy of shooting time interval and phase, wherein the phase is a remainder obtained by dividing shooting time by the shooting time interval.

12. The system according to claim 11, wherein shooting settings are adjusted by a user manually or adjusted by the user partially after auto adjustment shooting settings, comprising one or more of:
shooting time interval itself, target phase itself, image resolution, sensor type, exposure time, sensor sensitivity, focus distance, lens aperture, white balance, gamma correction, image un-distortion, image post-processing, or image recognition by additional machine learning system.

13. The system according to claim 11, wherein the instructions further cause the processor to:
attach a timestamp of the timer of the smart device or the image sensor to each image according to a consistent rule;
measure elapsed times between adjacent captured frame timestamps;
get an actual shooting time interval by averaging of measured elapsed times; and
confirm stability of shooting time interval by checking if variance of measured elapsed times is smaller than a predetermined threshold.

14. The system according to claim 11, wherein the instructions further cause the processor to:
perform injection shooting with some exposure time lengths and then measure an actual phase shift length;
test multiple injection shots with different exposure time length, and clarify a model of a relationship between injection length and phase shift length in run-time under some shooting settings; and
if the model of the relationship is fixed for some types of smart devices and some shooting settings, calculate inversely a best exposure time length of an injection shot from a current phase error.

15. The system according to claim 14, wherein when different elapsed time after the injection shot appears and the time lengths are A and B, A is smaller than constant shooting time interval, B is larger than the constant shooting time interval, both of A and B appear only once after the injection shot, A+B is equal to 2T+δ, and T is a controllable injection shot time length and δ is device-specific constant time length, the instructions causing the processor to:
get the constant shooting time interval and check its stability by measuring the shooting time intervals multiple times;
measure A+B after the injection shot in which length of shooting time is T;
obtain an average value of δ by multiple values calculated by A+B−2T, and check the stability of δ;
obtain the current phase error ε equal to phase minus target phase which is half of the shooting time interval;
obtain T so that ε+2T+δ is equal to integral multiplication of shooting time interval; and
perform an injection shot in which length of shooting time is T, to make phase error zero.

16. The system according to claim 11, wherein when the smart device is selected by one or more other smart devices, the instructions further cause the processor to:

perform an automatic adjustment of shooting settings and wait for conversion of the shooting settings;

measure an adjustment result;

broadcast the adjustment result to one or more other devices, to capture with the same shooting settings by the plurality of smart devices;

periodically determine a phase error at each smart device; and when a user starts still capturing or continuous capturing, capture images synchronously among all the smart devices, wherein shooting time intervals are the same and phase error is zero.

17. The system according to claim 11, wherein when the smart device selects the other smart device, the instructions further cause the processor to:

receive a result of automatic adjustment of shooting settings from the other selected device, to capture with the same shooting settings by the plurality of smart devices;

periodically determine a phase error at each smart device; and when a user starts still capturing or continuous capturing, capture images synchronously among all the smart devices, wherein shooting time intervals are the same and phase error is zero.

18. The system according to claim 11, wherein the instructions further cause the processor to:

display a user interface to let a user select "Auto", "Manual", or "Follow", a following device, and related parameters, for each setting item and parameter of shooting settings; and when "Auto" is selected, update related settings automatically and independently;

when "Manual" is selected, use user's manual settings independently; or when "Follow" is selected, use following device's settings.

19. A method for operating a smart device, comprising:

synchronizing, by a processor, a time of one or more timers of the smart device or image sensors among a plurality of smart devices, based on a protocol for time synchronization on wireless communication by using a communication device, wherein the smart device comprises the one or more image sensors, the communication device, and the processor; and controlling, by the processor, shutter opening and closing timing of each image sensor based on the synchronized time, wherein the timing is adjusted to keep consistent shooting time interval and phase, wherein the phase is a remainder obtained by dividing shooting time by the shooting time interval.

20. A non-transitory computer-readable storage medium having instructions stored therein, which when executed by a processor, cause the processor to:

synchronize a time of one or more timers of a smart device or image sensors among a plurality of smart devices, based on a protocol for time synchronization on wireless communication by using a communication device; and control shutter opening and closing timing of each image sensor, to keep constancy of shooting time interval and phase, wherein the phase is a remainder obtained by dividing shooting time by the shooting time interval.

* * * * *